United States Patent

[11] 3,615,878

[72] Inventors Hung Chi Chang
Monroeville, Pa.;
Ting Li Chu, Dallas, Tex.
[21] Appl. No. 7,186
[22] Filed Jan. 30, 1970
[23] Division of Ser. No. 701,967, Jan. 31, 1968, Pat. No. 3,556,732
[45] Patented Oct. 26, 1971
[73] Assignee Westinghouse Electric Corporation
Pittsburgh, Pa.

[54] PROCESS FOR THE THERMAL TREATMENT OF A SEMICONDUCTOR MATERIAL HAVING A VOLATILE COMPONENT
6 Claims, 1 Drawing Fig.

[52] U.S. Cl. .......... 148/1.6

[51] Int. Cl. .......... B01j 17/02

[50] Field of Search .......... 148/1.6

[56] References Cited

UNITED STATES PATENTS

| | | | |
|---|---|---|---|
| 3,129,061 | 4/1964 | Dermatis et al. | 148/1.6 X |
| 3,154,384 | 10/1964 | Jones | 148/1.6 X |
| 3,162,507 | 12/1964 | Dermatis et al. | 148/1.6 X |
| 3,318,669 | 5/1967 | Folberth | 148/1.6 X |

*Primary Examiner*—L. Dewayne Rutledge
*Assistant Examiner*—E. L. Weise
*Attorneys*—F. Shapoe and C. L. Menzemer

ABSTRACT: A semiconductor material having a volatile component is thermally treated in an ambient formed by a gaseous mixture which constantly maintains the stoichiometry of the semiconductor material during the thermal treatment.

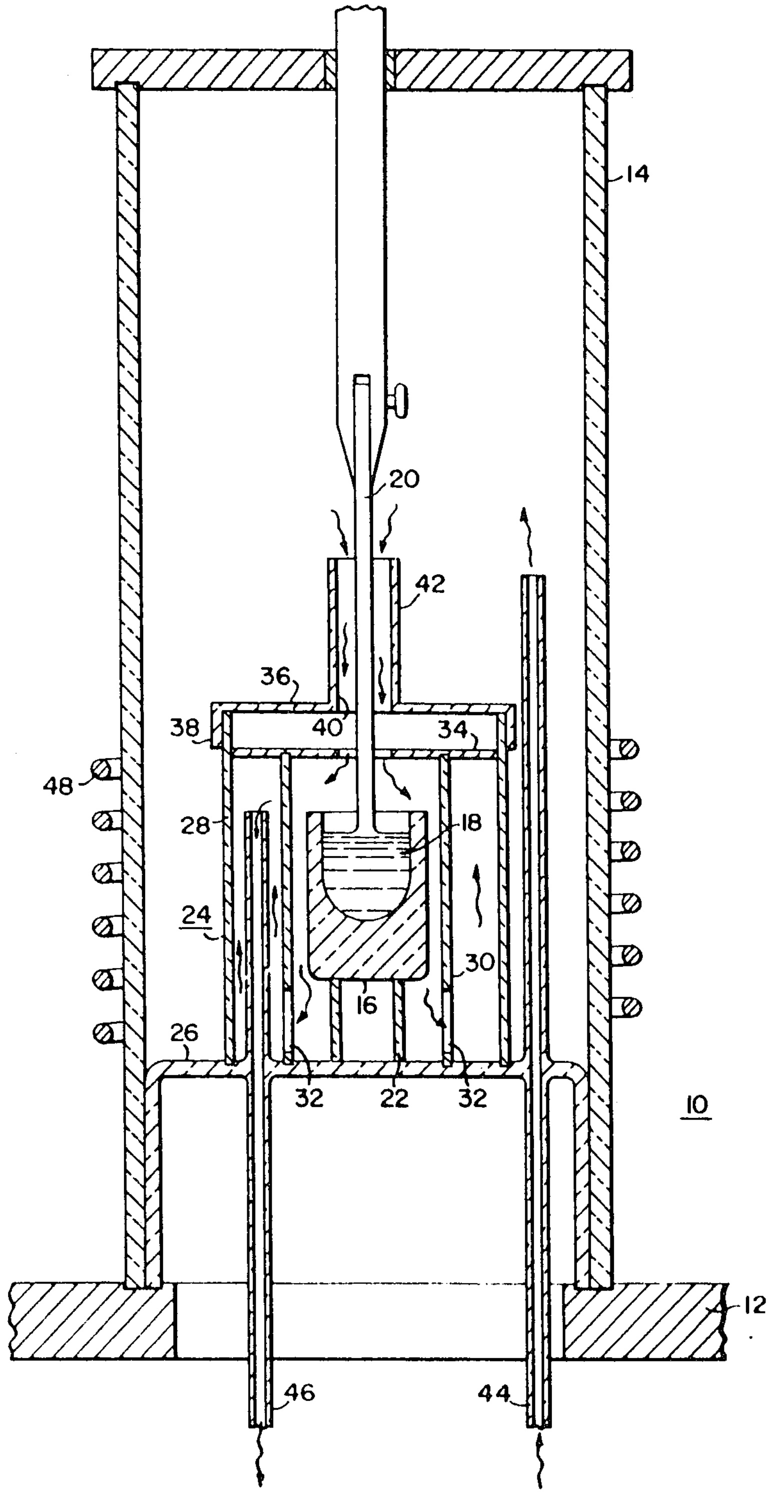
20
42
36
38
40
34
48
28
18
24
30
16
26
32
22
32
10
14
12
46
44

PROCESS FOR THE THERMAL TREATMENT OF A SEMICONDUCTOR MATERIAL HAVING A VOLATILE COMPONENT

CROSS-REFERENCE TO RELATED APPLICATION

This patent application is a division of copending patent application Ser. No. 701,967, filed on Jan. 31, 1968 now U.S. Pat. No. 3,556,732, dated Jan. 19, 1971.

BACKGROUND OF THE INVENTION

1. Field of the Invention

This invention relates to the thermal treatment of semiconductor materials having at least one volatile component, and in particular to the growth of dendritic ribbons of gallium arsenide.

2. Description of the Prior Art

The zone-refining and the crystal growth of semiconductor materials having at least one volatile component has to be carried out in a sealed enclosure maintained at an elevated temperature. This techniques has many difficulties among which is the efficiency of the zone-refining of the material is greatly hampered by the presence of volatile impurities and the impurities forming volatile compounds during the process which cannot be removed from the system. Additionally, the growth of a dendritic ribbon of this type semiconductor material is almost impractical by this technique.

To reduce the loss of the volatile component of the semiconductor material being heat treated several techniques are either employed or have been suggested. One may employ the demountable closed system such, for example, as the vapor-seal plug method described in the U.S. Pat. No. 2,921,905. Another technique is to employ the syringe-type furnace of P. L. Moody and C. Kohn. In either case, the major disadvantages of the sealed tube technique is still encountered.

Additionally the use of inert gases to suppress the loss of the volatile component from the semiconductor material may also be employed.

SUMMARY OF THE INVENTION

In accordance with the teachings of this invention there is provided a process for the thermal treatment of a semiconductor material comprising a volatile component. The thermal treatment process is carried out in an ambient formed by a gaseous mixture comprising at least the volatile component of the material in a gaseous form. The amount of the volatile component present in the gaseous form is sufficient to maintain the stoichiometric composition of the semiconductor material during the thermal treatment.

DRAWINGS

FIG. 1 is a view, partly in cross section, of apparatus embodying a gas flow system for the thermal treatment of a semiconductor material having at least one volatile component and made in accordance with the teachings of this invention.

DESCRIPTION OF THE INVENTION

The atmosphere of this invention and the principle of supplying a continuous enriched arsenic gas flow is suitable for the zone-refining of gallium arsenide semiconductor material as well as for the growth of gallium arsenide crystals and dendrites from a molten source. However, to more particularly describe the invention the invention will be described as growing gallium arsenide dendritic material in an arsenic enriched atmosphere.

With reference to FIG. 1 there is shown apparatus 10 suitable for growing gallium arsenide dendritic material. The apparatus 10 comprises a suitable baseplate 12 to which is attached an upright cylinder 14, preferably a heavy walled quartz tube. The joint between the cylinder 14 and the plate 12 is gastight. The cylinder 14 is closed at its far end and the material grown passes through a gastight sealing means of a centrally disposed aperture in the far end.

Disposed within the cylinder 14 is a crucible 16 containing a melt 18 of gallium arsenide from which a dendritic web 20 of gallium arsenide single crystal material is grown. The crucible 16 is preferably mounted on a hollow support member 22 within a melt furnace enclosure 24. The furnace enclosure 24 is in turn mounted on cup-shaped support member 26 having a U-shaped cross section, the sides of which are closely fitted to the inside surface of the cylinder 14 to provide a gastight seal. The sides of the member 26, or the surface of the cylinder 14, or both, may be ground and polished to achieve the gastight fit.

The melt furnace enclosure 24 comprises a nonpermeable outer jacket member 28 comprising a suitable inert material such, for example, as fused quartz. The material must be inert in the temperature range of approximately 650° C. The jacket member 28 is affixed by a gastight joint to the cup-shaped member 26. The crucible 16 is centrally disposed within the space defined by the outer jacket member 28. Between the crucible 16 and the jacket member 28 there is disposed one or more concentric baffles 30, each of which is joined by a gastight seal to the cup-shaped member 26. Each baffle 30 has an aperture 32 in either one end portion, or the other, allowing access to the space on the other side of the baffle 30. When more than one baffle 30 is employed, the aperture 32 is disposed at a different end of adjacent baffles 30. An apertured lid 34 is disposed within, and preferably joined to the inside wall of the jacket member 28. The lid 34 rests on top of, and is preferably joined to, each baffle 30. The center of the aperture of the lid 34 is axially aligned with the melt 18 and the dendritic gallium arsenide 20 is withdrawn from the melt 18 through the aperture. The baffles 30 and the lid 34 each contain a material suitably impervious to, and chemically inert with, the gaseous mixtures employed in the apparatus 10.

A cover 36 made of a gas impervious material and chemically inert to the gaseous atmosphere of the apparatus 10 is disposed on the jacket member 28. The cover 36 has a downwardly extending peripheral flange 38, a centrally disposed aperture 40, and an upwardly extending tubular section 42. The internal diameter of the section 42 should be as small as possible to minimize the diffusion of the volatile components of the growing material 20.

At least one gas inlet tube 44, integral with or joined by a gastight seal, passes through the cup-shaped member 26 and extends into the interior of the cylinder 14 between the melt furnace 24 and the wall of the cylinder 14. A gas outlet tube 46 extends from within the passageway between the last baffle 30 and the jacket member 28 through the cup-shaped member 26 and through the aperture of the baseplate 12. The outlet tube is integral with, or joined by a gastight seal to, the member 26. The tubes 44 and 46 are gas impervious and comprise materials chemically inert to the gaseous atmosphere of the apparatus 10.

Disposed about a portion of the outside of the cylinder 14 is a means 48, preferably an RF heater coil, which heats the crucible 16 and the melt 18 contained therein. The melt furnace enclosure 24 is designed to maintain the temperature within at approximately 650° C.

The gallium arsenide dendrite 20 is grown from the melt 18 which is kept molten by the RF heater 48. As the dendrite 20 grows, the vapor pressure of the arsenic in the semiconductor material, both in the dendrite and the melt, is great enough to cause arsenic to evaporate and leave gallium rich material remaining. Consequently, the grown dendrite 20 has a constantly changing arsenic content as it is grown. A gaseous mixture of an arsenic halide and hydrogen is introduced into the apparatus 10 through the inlet tube 44, into the confines of the cylinder 14. The mixture then flows downward through the tubular section 42 about the dendrite 20, through the aperture 40, and into the space defined by the lid 34 and the cover 36. The gaseous mixture then flows downward through the aperture of the lid 34 and about the surface of the melt 18 and the crucible 16, thence through the aperture 32 of the baffle 30 and upwardly into the space defined by the baffle 30 and the jacket member 28. The gaseous mixture is then forced to flow downwardly through the outlet tube 46 where it is exhausted from the apparatus 10.

The thermal reduction of the arsenic halide yields arsenic and hydrogen halide. The flow of the gaseous arsenic halide is controlled so that the amount of arsenic lost by evaporation from the melt 18 is balanced by the amount of arsenic absorbed by the melt 18 from the thermal reduction of the arsenic halide occurring at the melt's surface. This maintains the stoichiometry of the melt 18. The thermal reduction of the gaseous arsenic halide occurs predominantly at the surface of the gallium arsenide melt and is negligible in the cooler regions of the system.

The stoichiometry of the grown dendritic material 20 is maintained by the proper adjustment of the composition of the gaseous mixture, the flow rate of the gaseous mixture, and the pressure of the gas flow system.

Any reaction between the gallium of the melt 18, or the dendrite 20, and the hydrogen halide formed in the reduction process is compensated by introducing a sufficient amount of gallium into the system.

The pressure in the system is everywhere the same. However, gradients in the partial pressures of arsenic, arsenic halide and the like do exist. These gradients allow the transport of arsenic to exist and depositions of arsenic on the walls of the cylinder 14 may occur if the furnace enclosure 24 is not present. The components of the enclosure 24 form a radiation shield for thermal insulation about the melt 18, thereby decreasing the arsenic vapor pressure gradient from the melt and thereby suppressing the transport of arsenic from the melt to the inner wall of the cylinder 14.

The apparatus 10 permits the melt 18 to retain a high degree of stoichiometry of the melt 18 which in turn permits the rapid growth of the dendritic crystals in ribbon, or web, form. The employment of a gas flow system in the apparatus 10 permits the continuous removal of volatile impurities from the systems.

In the zone-refining, or zone melting, of a semiconductor material having one or more volatile components, the diffusion of the volatile component from high temperature to lower temperature regions may be suppressed by increasing the pressure in the system.

Although the invention has been described with specific reference to gallium arsenide, it is to be noted that this apparatus and process is suitable for use with other semiconductor material such, for example, as indium arsenide, indium phosphide, mixed compounds of indium arsenide and indium phosphide, gallium phosphide, and aluminum nitride. The gaseous mixture employed in the gas flow system must be compatible with the material being grown or refined.

Additionally, if the material being treated in the apparatus 10 has the capability of depositing material on the outside of the member 24, an additional cover, or a peripheral flange portion added to the cover 36, may be provided to prevent any gas from reaching the area surrounding the member 24.

We claim as our invention:

1. A process for the thermal treatment of a semiconductor material containing at least one volatile component comprising a. heating a semiconductor material containing at least one volatile component within a heated substantially gastight enclosure;
b. passing said semiconductor through a gastight sealing means of at least one end of said enclosure;
c. introducing into the enclosure a gaseous mixture containing at least the volatile component of said semiconductor material;
d. passing the gaseous mixture along the longitudinal axis of the semiconductor material;
e. thermally reducing a portion of the gaseous mixture to release at least a portion of the volatile component of the semiconductor material from said gaseous mixture whereby the stoichiometric composition of said semiconductor material is maintained; and
f. exhausting excess gaseous mixture and any reactant products of said reacted gaseous mixture contained therein.

2. The process of claim 1 wherein:
the semiconductor material is heated sufficiently to form a melt; and including growing a dendritic ribbon of the semiconductor material from a melt of said material before passing the material through the sealing means;
providing a baffled furnace enclosure for said melt;
passing the gaseous mixture along the longitudinal axis of the ribbon opposite to the direction that the ribbon is growing and into the baffled furnace enclosure; passing the gaseous mixture about the melt and through the passageways defined by the baffled furnace enclosure in a serpentine manner.

3. The process of claim 2 in which:
the material of the melt is one selected from the group consisting of indium arsenide, indium phosphide, gallium phosphide, aluminum nitride, gallium arsenide, and a compound of indium arsenide and indium phosphide.

4. The process of claim 3 in which:
the material of the melt is gallium arsenide; and
the gaseous mixture comprises at least an arsenic halide and hydrogen.

5. The process of claim 4 including:
maintaining said baffled furnace enclosure at a temperature of approximately 650° C.

6. The process of claim 5 including:
introducing a gaseous gallium halide into said gaseous mixture.

* * * * *